United States Patent Office 2,865,888
Patented Dec. 23, 1958

2,865,888
AMINE-EPOXIDE COMPOSITIONS

Sylvan Owen Greenlee, Racine, Wis., assignor to Devoe & Raynolds Company, Inc., Louisville, Ky., a corporation of New York No Drawing. Original application February 11, 1952, Serial No. 271,069. Divided and this application August 22, 1957, Serial No. 679,755

8 Claims. (Cl. 260—47)

This invention relates to new complex hexamethylene diamine-epoxide compositions, and more particularly to such compositions capable of conversion into insoluble, infusible products, and valuable for use in making varnishes and protective coatings, in making molding compositions and articles, as adhesives, and in making films and fibres, etc. The invention includes new hexamethylene diamine-epoxy compositions and reaction products and articles and products made therefrom.

The new hexamethylene diamine-epoxy compositions and products are made by reacting hexamethylene diamine with complex epoxides produced by the reaction of polyhydric phenols with polyfunctional halohydrins or with polyepoxides to form complex reaction products containing terminal epoxide groups. Such epoxide products with which the amine is reacted are advantageously complex polymeric products resulting from the reaction of polyhydric phenols with polyfunctional halohydrin or polyepoxides in proportions to give terminal epoxide groups in the polymeric reaction products. Such complex epoxide products and compositions are described in my companion applications Serial No. 617,176, filed September 18, 1945 (now abandoned), Serial No. 621,856, filed October 11, 1945 (now abandoned), and Serial No. 626,449, filed November 2, 1945, now Patent No. 2,592,560.

One of the objects of the present invention is the production of infusible and insoluble reaction products of complex epoxides and amine in suitable proportions which have remarkable chemical resistance combined with hardness, toughness, flexibility, lack of concentration on conversion, and other desirable properties.

Another object of the invention is the production of hexamethylene diamine-epoxide compositions capable of use as raw materials for the production of such conversion products.

Another object of the invention is the production of hexamethylene diamine-epoxy compositions which on conversion result in cross-linking of the complex epoxides through reaction of active hydrogens of the amine with epoxide groups.

Another object of the invention is the production of fusible hexamethylene diamine-epoxy compositions and reaction products useful for various purposes and still containing epoxy groups capable of further reaction.

Another object of the invention is the production of compositions and reaction products of polyepoxide with hexamethylene diamine in proportions giving final infusible products of remarkable chemical resistivity and other desirable properties.

Another object of the invention is the production of solutions of such hexamethylene diamine-epoxy compositions for use in making varnishes and protective coatings, impregnating solutions, films, filaments, etc.

Another object, of the invention is the production of molding mixtures and compositions capable of conversion into infusible, molded articles and products, and the articles and products so produced.

Other objects of the invention and the nature and advantages of the invention will further appear from the following more detailed description.

In my companion application Serial No. 617,176, filed September 18, 1945 (now abandoned), I have described complex, polymeric reaction products of polyhydric phenols with polyfunctional halohydrins such as epichlorhydrin and glycerol dichlorhydrin, with the difunctional chlorhydrin used in proportions in excess of that equivalent to the polyhydric phenol and less than twice the equivalent amount, by carrying out the reaction with the addition of caustic alkali equal to or somewhat in excess of the amount required to combine with the halogen of the halohydrin and giving complex, polymeric products containing both terminal epoxy groups and terminal primary hydroxyl groups, and with the epoxy groups in general considerably in excess of the terminal primary hydroxyl groups. Such complex, polymeric epoxyhydroxy products and compositions are advantageously used for reaction with hexamethylene diamine to form the new amine epoxy compositions and products of the present invention.

In my companion application Serial No. 621,856, filed October 11, 1945 (now abandoned), I have described epoxy-hydroxy compositions resulting from the reaction of a polyhydric phenol with a polyfunctional halohydrin such as epichlorhydrin in approximate proportions of 2 mols of epichlorhydrin to one of dihydric phenol to give resinous products containing both terminal epoxy and hydroxy groups with the proportion of terminal epoxy groups considerably in excess of the terminal hydroxy groups. Such epoxy-hydroxy compositions are also advantageously used in forming the new hexamethylene diamine-epoxy compositions and products of the present invention.

In my companion application Serial No. 626,449, filed November 2, 1945, now Patent No. 2,592,560, I have described new polyepoxy products and compositions obtained by the direct addition of polyhydric phenols with polyepoxides and with the proportion of polyepoxides reacting with the polyhydric phenols in excess of the equivalent amount so that the resulting reaction products will contain terminal epoxy groups. Such polyepoxy reaction products, and particularly complex polymeric polyepoxy reaction products, are advantageously used in making the new amine-epoxy compositions and products of the present invention.

In reacting hexamethylene diamine a number of active hydrogens are provided by the amino groups which are separated from each other by hydrocarbon groups and enable the amine to react with a number of epoxide groups with resulting cross-linking to give complex amine-epoxy reaction products.

Fusible hexamethylene diamine-epoxy reaction products can be prepared with limited amounts of hexamethylene diamine under proper reaction conditions. The maximum complexity of hexamethylene diamine-epoxy reaction products appears to be obtained when hexamethylene diamine is used with the complex epoxides in proportions close to the equivalent amounts. Complexity of the products appears to decrease as more or less than the equivalent amount of hexamethylene diamine is used, but infusible products can nevertheless be obtained with more or less than the equivalent amount of the hexamethylene diamine. Thus it is possible to obtain infusible products with considerably less than the equivalent amount of the hexamethylene diamine, as well as with more than the equivalent amount, probably due to the fact that the complex epoxides are relatively high in molecular weight and the amount of coupling necessary to make them infusible is relatively small.

The complexity of the final products may also be controlled to some extent otherwise than by adjusting the ratio of hexamethylene diamine and epoxy reactants, as by using moderate reaction conditions such as lower temperatures or shorter reaction periods or both, to give fusible products which are valuable intermediate products and which may, if the hexamethylene diamine and epoxide are only partially reacted and are in proper proportions for further reaction, give infusible products when subjected to such further reaction or conversion.

The complex epoxide compositions used with the hexamethylene diamine are themselves capable of polymerization by reaction of epoxy groups with hydroxyl groups, particularly in the presence of small amounts of a catalyst. The complex epoxy compositions made from polyhydric phenols and epichlorohydrin contain both terminal epoxy groups and terminal primary hydroxyl groups and, in general, the number of terminal epoxy groups is considerably in excess of the number of terminal primary hydroxyl groups. In polymeric products containing intermediate hydroxyl groups, the total number of hydroxyl groups may be considerably in excess of the number of epoxy groups. Polymerization of such complex epoxyhydroxy compounds may take place through terminal epoxy and primary hydroxyl groups to form long chain polymers or through terminal epoxy groups and intermediate hydroxyl groups to form polydimensional polymers.

In the case of polyepoxides made by the direct reaction of bisphenol with an excess of polyepoxide there will also be hydroxyl groups, and, in the case of polymeric products, the number of hydroxyl groups may be in excess of the terminal epoxy groups. Such products are capable of polymerization by reaction of terminal epoxide groups with intermediate hydroxyl groups to form complex, polydimensional polymers, particularly when a catalyst is used.

When such complex epoxide compositions are reacted with hexamethylene diamine, the action of the amine may be one of direct addition through epoxide groups and it may be in part a catalytic action promoting the combination of epoxy and hydroxyl groups to form ether linkages, particularly where the hexamethylene diamine is used in less than equivalent proportion such that there is insufficient amine to react with all of the epoxide groups.

The complex epoxide compositions which are reacted with the hexamethylene diamine are resinous products which can be made of varying melting points, epoxide content, and degree of polymerization from soft resins to harder resins of higher melting point. In general, these resins are soluble, unless too highly polymerized, in solvents such as acetone, methyl ethyl ketone, diacetone alcohol, cyclohexanone, etc. and can be used in solution with the addition of hexamethylene diamine in forming liquid compositions for use e. g. in making clear or pigmented varnishes, in making transparent films and filaments, and in impregnating wood, fabrics and other porous material, etc.

The reaction of hexamethylene diamine with such complex epoxides appears to be one of cross-linking the complex epoxide molecules through reaction of the hexamethylene diamine with epoxide groups. But such cross-linking reaction may be combined with a simultaneous polymerization reaction between epoxide and hydroxyl groups, particularly when the amine is used in less than equivalent proportion.

When polyepoxides are reacted with the hexamethylene diamine and where the polyepoxides contain only or mainly terminal epoxide groups with intermediate hydroxyl groups, the action of the hexamethylene diamine is such that considerably less than the equivalent amount of hexamethylene diamine will react with the polyepoxide to form infusible products; while the epoxide groups which are present in excess of those reacting with the hexamethylene diamine may react to a greater or less extent with hydroxyl groups, in which case the complex epoxy-hexamethylene diamine reaction products may have the polyepoxides united in part through amine cross-linking and in part through epoxy-hydroxide reaction to form ether linkages.

Similarly in the case of the complex polymeric epoxides which also contain terminal hydroxyl groups, the final hardening operation, particularly when less than the equivalent amount of hexamethylene diamine is used, may be in part cross-linking through the amine and in part by polymerization through epoxy-hydroxy reactions to form ether linkages.

The complex epoxides and polyepoxides used for reacting with the amines may themselves be carried to a high degree of polymerization in which case only a small amount of hexamethylene diamine may be necessary to convert the highly polymerized epoxides into an infusible state. With products of lower melting point and lower degree of polymerization an increased amount of cross-linking or polymerization in the presence of the amine, a large proportion of amine may be necessary to give the final insoluble product.

In referring to equivalent amounts of hexamethylene diamine and of the complex polyepoxides, each active hydrogen attached to nitrogen of the amine is considered equivalent to one epoxide group. The equivalent weight of the hexamethylene diamine is the weight which will contain one such active amine hydrogen when used with an equivalent weight of the complex epoxides containing one epoxide group.

In referring to equivalent amounts of hexamethylene diamine, or to less than equivalent amounts, the amounts are those used with the complex epoxides, and it is not intended to mean that the amount used is completely reacted. While theoretically complete reaction might take place it is probable that the reaction is a partial and incomplete reaction between part of the active hydrogens of the hexamethylene diamine and the epoxide groups.

The epoxide equivalent of the complex epoxides used can be determined for practical purposes by determining the equivalent weight of the composition per epoxide group.

The epoxide content of the epoxide-hydroxy compositions hereinafter indicated were determined by heating a 1 gram sample of the epoxide composition with an excess of pyridine containing pyridine hydrochloride (made by adding 16 cc. of concentrated hydrochloric acid per liter of pyridine) at the boiling point for 20 minutes and back titrating the excess pyridine-hydrochloride with 0.1N sodium hydroxide using phenolphthalein as indicator, and considering that 1 HCl is equal to 1 epoxide group.

*Example*

One-half of the equivalent of hexamethylene diamine (15 parts by weight) was mixed with a hydroxy-epoxy composition resulting from the reaction of bisphenol with epichlorhydrin with the use of caustic soda according to said companion applications having a softening point of 100° C., an equivalent weight to epoxide of 860 and an average molecular weight of 1133. The mixture was then heated for 30 minutes at 150° C. The resulting product was infusible and possessed the properties and advantages herein set forth.

In a similar manner other complex epoxides made from other polyhydric phenols with epichlorhydrin can be similarly treated to give infusible products or fusible resins the amount of hexamethylene diamine required varying somewhat with different epoxides.

In a similar manner complex polyepoxides can be similarly compounded with different proportions of hexamethylene diamine to give infusible products or fusible products depending upon the proportions of hexamethylene diamine used and upon the particular polyepoxy composition employed for reaction therewith.

While the example given above includes heating of the hexamethylene diamine-epoxide composition to bring about the reaction, it is also possible to obtain rapid conversion of the epoxide resins with somewhat larger amount of hexamethylene diamine at lower temperatures.

It is thus possible by using suitable combinations of hexamethylene diamine and complex epoxides to form infusible products at room temperature.

Solutions of the reaction products give films formed by spraying or brushing the material on to surfaces which lose the solvent, and show fair conversion within 4 or 5 hours, and at 10 to 12 hours the films are extremely flexible although at the beginning the films are very brittle.

It is a characteristic of such films that the reaction of the hexamethylene diamine with the epoxide resin under suitable conditions will convert an initial brittle film into a desirable flexible film. Moreover, unlike oleoresinous varnishes and oil modified alkyd resins, the film thickness of the new compositions is not a factor in their conversion. In fact, layers of thicknesses which would no longer be classified as films, e. g. from one-quarter to one-half inch, show no signs of surface dry but convert uniformly throughout the layer. Thus one thick coat of this material may be applied where several thin coats of other types of film-forming compositions would be used.

The new compositions made with hexamethylene diamine in suitable proportions thus form valuable protective layers and films when used either as clear varnishes or as pigmented varnishes, giving infusible films of remarkable resistance to chemicals and having other valuable desirable properties.

The new compositions are also valuable for use in making molded objects, where the conversion forms infusible, molded products. They are also valuable for use in impregnating and laminating wood and fabrics, in making self-sustaining films and filaments, etc. It has been observed that films will harden even when immersed in water.

Infusible products produced from the new hexamethylene diamine-epoxy compositions have been found to have extreme chemical stability. Varnish films prepared from several of these compositions were unaffected by immersion in 50% $H_2SO_4$ for one hour. Such films when immersed in boiling acetone (56.1° C.) for one hour softened so that they could be scratched with the fingernail while in the boiling acetone; however, such films quickly returned to their original glossy hardness upon removal from the boiling acetone and apparently little or no solution had occurred.

The infusible films show remarkable stability to caustic alkali. Films immersed in 50% aqueous sodium hydroxide and kept in a sealed bomb in an oven at 100° for one week, and similar tests using 5% aqueous sodium hydroxide, gave no observable effect from such treatment both in the case of air dried and baked films. Such stability to aqueous caustic alkali at high temperatures is surprising and a distinguishing characteristic of the new films. Such films are suitable as liners for food and processing equipment for many industrial uses. Such properties also make the new compositions valuable as film forming compositions for application over alkaline cement and alkaline plastering surfaces.

Molded objects and films formed from the infusible products of the present invention have extremely hard, glossy surfaces but, nevertheless, in spite of their extreme hardness, the structure is remarkably tough and flexible. In the past it has been generally recognized that in order to obtain hard films (shellac films being an example) flexibility must be sacrificed; but the insoluble films of the present invention combine hardness with flexibility.

As an indication of the hardness and flexibility of the films made by the reaction of amines with the complex epoxides, extremely hard, infusible films on glass enabled ribbons of indefinite length to be stripped from a film from one to two mils thickness by the use of a sharp knife blade.

Such films remain surprisingly flexible at sub-zero temperatures. Varnish films prepared from these compositions have been tested at −80° C. and showed good flexibility. In general physical toughness and structure the infusible hexamethylene diamine-epoxy resins are comparable to fingernail and horn.

When molded objects are formed by converting a mixture of the epoxy and hexamethylene diamine in a mold no contraction has been observed and, in fact, a slight expansion was observed in some cases and reproducible results obtained. While I do not desire to limit myself by any theoretical explanation of the expansion of the resins on hardening, it may be the opening up of the epoxide groups through reaction with amine or the opening up of epoxide groups through reaction with hydroxyl groups to form ether linkages tends to cause separation of the reacting molecules instead of contraction which is characteristic of many condensation polymerization reactions.

This lack of contraction or slight expansion in the mold is highly valuable for many applications, enabling tight fitting molded articles to be obtained. For example, brushes of many types are made by using a heat converting resin to cement the bristles into the brush ferrule. If the resin contracts during heat conversion the molded material becomes loose fitting in the ferrule. The new epoxide-amine resins and compositions of the present invention give a tight fitting mold within the brush ferrule. Similarly molded inserts can be made which are tight fitting when the composition is hardened in place.

The new infusible epoxide-hexamethylene diamine reaction products give extremely glossy films when used as clear or as pigmented enamels. This is highly desirable in the protective coating industry to obtain the desired amount of gloss, since it is often impossible to obtain such gloss when known vehicles are used.

The new amine-epoxide compositions may be pigmented with the usual pigments known to the protective coating industry to give enamels. The epoxide may be pigmented either before or after the amine is added.

The new epoxide-hexamethylene diamine reaction products, particularly with the lower proportions of amines, have been found to possess an extremely high adherence to glass, metal, wood, and other surfaces, and these compositions can be used to advantage in the lamination of glass or metal, in the lamination of wood to form plywood or other laminated wood products, etc.

The new compositions, particularly when used in solution, are valuable impregnating compositions for surface coatings or for impregnating porous and fibrous materials such as fabrics and other porous and fibrous materials. It is one advantage of the new compositions that high concentrations can be used with a limited amount of solvent such that thick coatings are readily applied and the solvent readily removed, the hardening taking place in the film through chemical reaction without the formation of by-products, the chemical reaction being an addition reaction within the epoxy-hexamethylene diamine composition itself.

The color stability of the new infusible films has been found to be exceptionally good, both at ordinary temperatures and at high temperatures.

The new epoxy-hexamethylene diamine compositions and reaction products, particularly when converted into the infusible state, present a remarkable combination of desirable properties, including higher resistance to ultraviolet light (minimum ultraviolet absorption); extreme resistance to hydrolysis by water and alkali with very low water permeability or absorption; extreme toughness; speed of drying approaching lacquer or shellac; adhesion to metal, glass and siliceous surfaces; flexibility at sub-zero temperatures; high degree of mar resistance; resistance to chemicals; insolubility to solvents; non-yellowing; ability to stand temperatures up to 400° F. with little or no discoloration; wettability to most pigments;

low viscosity at high solids content of solutions; and hardening of thick films through chemical addition reactions within the film itself so that paint and varnish coatings far beyond the usual thickness can be applied.

These remarkable properties and combinations of properties make the new compositions, and products made therefrom, valuable for many practical purposes. No other materials so far as I am aware possess so many of the features desired for protective coatings, molded objects, films, filaments, etc.

This application is a division of my prior application Serial No. 271,069, filed February 11, 1952, which application is in turn a continuation-in-part of my prior application Serial No. 617,177, filed September 18, 1945, now Patent No. 2,585,115.

I claim:

1. A composition of matter which is capable of hardening which comprises an unreacted mixture of normally solid resinous glycidyl polyethers of a polyhydric phenol and hexamethylene diamine.

2. A composition of matter which is capable of hardening which comprises an unreacted mixture of normally solid complex resinous epoxides and hexamethylene diamine, said complex resinous epoxides being polymeric polyethers of dihydric phenols, said dihydric phenols being free from functional groups other than phenolic hydroxyl groups, said resinous epoxide resulting from the heating of the dihydric phenol with an excess of epichlorhydrin with caustic alkali and having intermediate alcoholic hydroxyl-containing aliphatic groups and epoxide-containing terminal aliphatic groups, said resinous epoxide being free from functional groups other than alcoholic hydroxyl and epoxide groups, and the amount of hexamethylene diamine being from about .25 to 1.7 of the amount equivalent to the resinous epoxide, considering one active hydrogen of the amine groups equivalent to one epoxide group of the complex epoxide.

3. The heat reaction product of the composition of matter of claim 1.

4. The heat reaction product of the composition of matter of claim 2.

5. The method of making insoluble, infusible molded products which comprises admixing normally solid complex resinous epoxides and hexamethylene diamine to form a solvent-free molding mixture, the complex resinous epoxides being polymeric polyethers of dihydric phenols, said dihydric phenols being free from functional groups other than phenolic hydroxyl groups, said resinous epoxides resulting from the heating of the dihydric phenol with an excess of epichlorhydrin and of caustic alkali and having intermediate alcoholic hydroxyl-containing aliphatic groups and epoxide-containing terminal aliphatic groups, said resinous epoxides being free from functional groups other than alcoholic hydroxyl and epoxide groups, and the amount of hexamethylene diamine being from about .25 to about 1.7 of the amount equivalent to the resinous epoxide, considering one active hydrogen of the amine groups of the polyamine equivalent to one epoxide group of the complex epoxide, and molding said mixture with the application of heat to form an insoluble, infusible molded product.

6. The process according to claim 5 in which the resinous epoxide is a polymeric polyether of dihydroxydiphenyldimethyl methane.

7. Molded articles produced by the process of claim 5.

8. Molded articles produced by the process of claim 6.

References Cited in the file of this patent

UNITED STATES PATENTS

| | | |
|---|---|---|
| 2,444,333 | Castan | June 29, 1948 |
| 2,786,794 | Gams et al. | Mar. 26, 1957 |

UNITED STATES PATENT OFFICE
Certificate of Correction

Patent No. 2,865,888 December 23, 1958

Sylvan Owen Greenlee

It is hereby certified that error appears in the printed specification of the above numbered patent requiring correction and that the said Letters Patent should read as corrected below.

Column 1, line 45, for "concentration" read —contraction—; column 6, line 18, before "polymerization" insert —and—.

Signed and sealed this 28th day of April 1959.

[SEAL]

Attest:
T. B. MORROW,
*Attesting Officer.*

ROBERT C. WATSON,
*Commissioner of Patents.*